UNITED STATES PATENT OFFICE 2,005,509

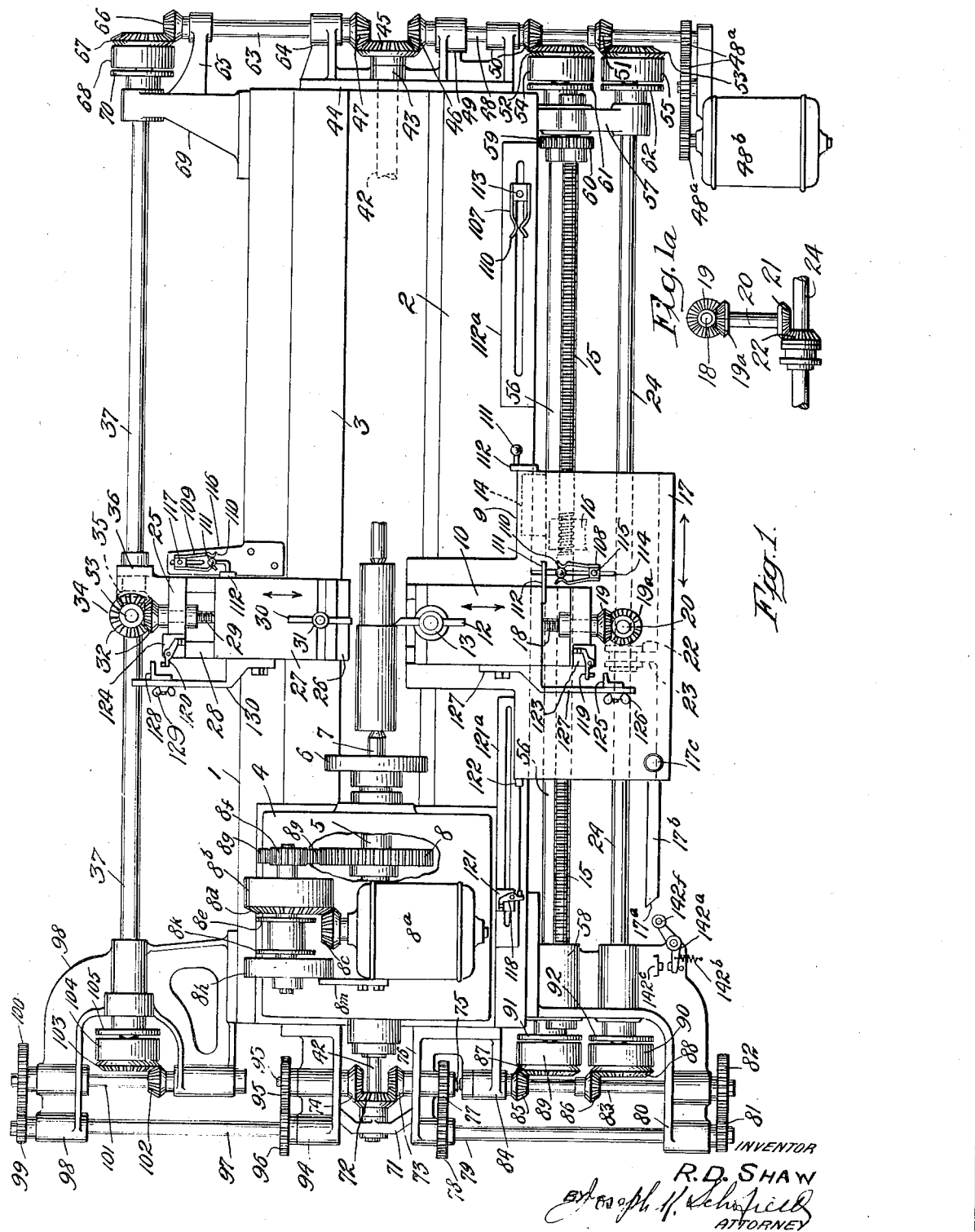

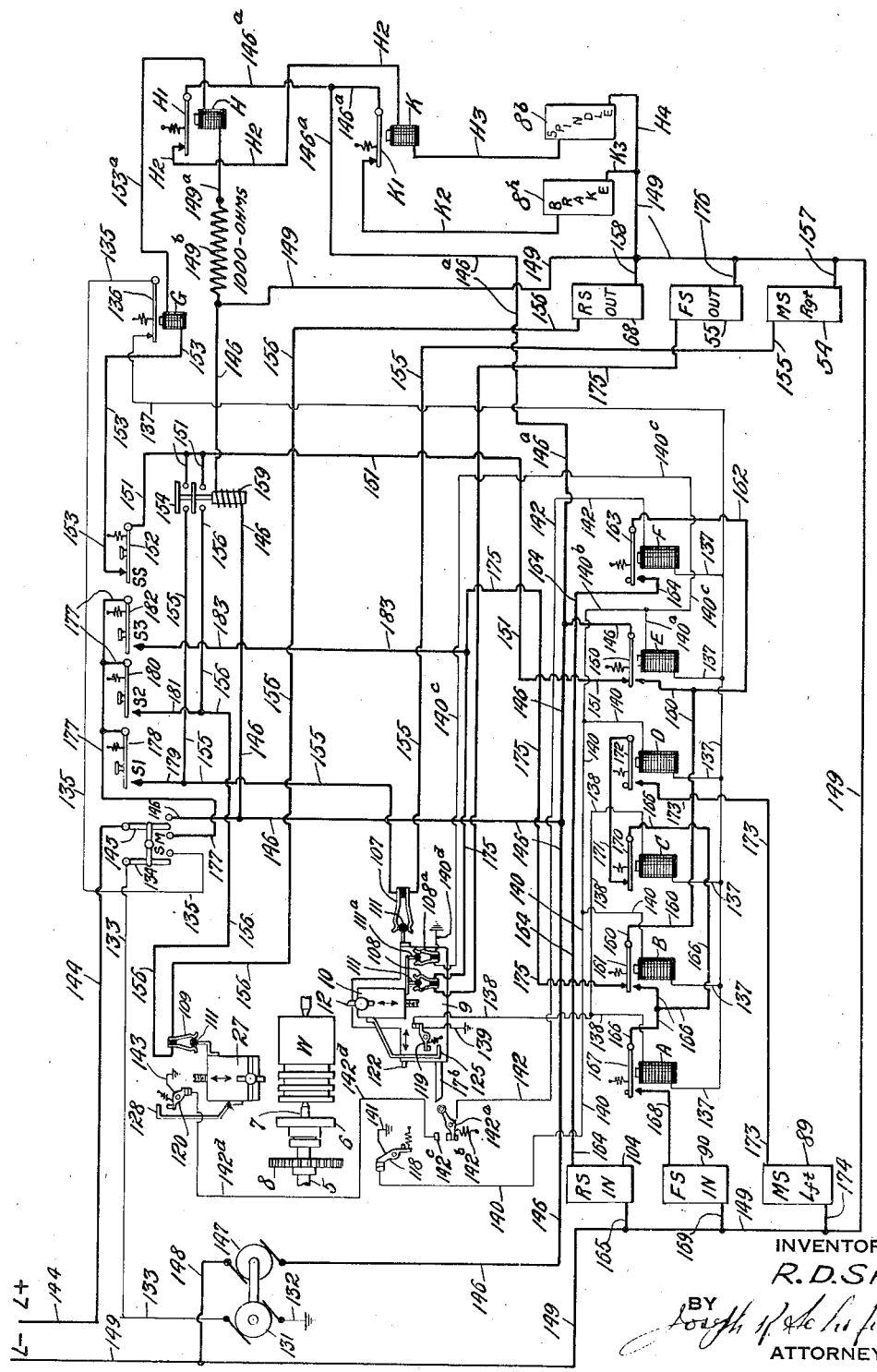

ELECTRICALLY OPERATED LATHE

Robert D. Shaw, Hartford, Conn., assignor to Pratt & Whitney Company, Hartford, Conn., a corporation of New Jersey Application December 1, 1933, Serial No. 700,519

12 Claims. (Cl. 82—2)

This invention relates to machine tools and particularly to an automatic metal turning lathe controlled by electrically operated means so that the movable slide members, as well as the starting and stopping of rotation of the spindle, may be operated in accordance with a predetermined cycle.

More particularly this invention relates to improvements in the automatic lathe shown and described in my copending application Serial No. 665,566 filed April 11, 1933 of which this application constitutes a continuation in part.

One object of the present invention is to enable the rear tool slide of an automatic lathe, such as described in the above referred to application, to be started on its cutting stroke at any point of or during any portion of the cutting movement of the main slide or front carriage, and then to return to its initial position on completion of the cutting stroke, in the regular cycle or at any prearranged time in the cycle.

In the previous machine the work supporting spindle is arranged to be rotated through gearing connections with the clutch magnets, but is here rotated by an independent clutch magnet. Therefore, a further object of importance in the present improvement is the arrangement whereby the work supporting and rotating spindle is idle except during the cycle of movements and is arranged to be started and stopped (by energizing and deenergizing the clutch magnet) by switches in suitable controlling circuits brought into action at the start of or during the cycle. Preferably when the cycle of operations is initiated the spindle rotation is started and may be stopped when the cycle is completed or more particularly when the cutting portion thereof is completed, after effecting the successive cutting operations. A further novel feature is that when the clutch magnet for rotating the spindle is deenergized, rotation of the spindle is stopped instantly by means of an interlocked electrically controlled magnetic brake. Incidentally, by this arrangement the brake is utilized to hold the spindle while the finished piece is being removed and a new work piece is being inserted.

In the machine of the previous application the rear slide is brought into the cycle by starting its in movement at the end of the forward movement of the front carriage which under some circumstances involves an unnecessary delay. Therefore, in order to shorten the cycle, a further object of the present improvement is to provide an adjustable abutment mounted on the longitudinally movable front carriage, and arranged to operatively engage a switch or contact carrying lever in the controlling circuit for the rear slide so that the in movement of the latter may be started at any selected point in the travel of the front carriage. The movement for the return of the rear slide to initial position after the cutting operation may, however, take place as previously described, or at any suitable time in regular sequence in the cycle. It is preferable that the in movement of the front and rear tool slide and the forward movement of the front carriage shall operate at normal speeds, but when the movements are to be reversed in the cycle and the carriage and slides are to be returned to their initial or starting positions, the rapid traverse clutch magnets are brought into action, as described in the previous application, after the respective cutting strokes are completed. The return movements are stopped upon the opening of the high potential contact switches at the end of the respective movements, or when the slides and carriage reach their prearranged starting positions, as in the above referred to application.

The present improvement also employs substantially similarly arranged magnetic clutches for operating the various slides, carriages or movable elements of the lathe, as described in the above referred to application, but in addition, a magnetic clutch is provided for rotating the work spindle, this clutch magnet being preferably operated by a separate motor suitably mounted on the machine, but obviously the spindle clutch may be geared with the other clutch magnets if desired. Between the spindle motor and the clutch magnet, the usual or any suitable change gears may be installed so that the spindle may be rotated at any desired speed when its clutch magnet is energized.

In the present instance an important advantage is obtained by operating the work spindle from a separate clutch magnet so that its speed may be changed more readily, and in particular its rotation may be started and stopped with the cycle of movements of slides. Furthermore, the present arrangement provides an added feature, that is stopping the spindle quickly and maintaining or holding it against rotation during the loading of the machine. This is facilitated, as previously indicated, by providing a suitable magnetic brake, and preferably the circuits for the clutch magnet for rotating the spindle and the magnet for operating the brake are interlocked so that when one is energized, the other is deenergized.

As in the automatic lathe described in the above referred to application, it is preferable to arrange the movements of the carriage and its tool slide so that the in movement of the slide takes place and the tool is moved into position for the cutting operation (depth of cut) on the work, and immediately this is followed by the forward movement (to the left in form shown) of the front carriage which movement continues through the cutting operation or until a predetermined point in the forward movement of the carriage is reached, at which point the out movement of the cross slide is started. In this statement motions of the rear cross slide have been ignored for these may be eliminated as hereinafter explained.

Similarly, as in the previous machine, the movements of the carriage or main slide and the respective cross slides are governed by rotating magnetic clutches, the magnets of which are arranged to be energized successively or at prearranged intervals to effect the required movements in the cycle. Preferably energization of the clutch magnets, and hence all movements of the carriage or slides are governed by controlling means carried upon and operated by movements of the slides themselves. The clutches may be operated in succession or otherwise by the automatically operated switches in circuits which preferably are arranged to operate relays controlling the energizing of the respective magnetic clutches.

It will be understood that, as in the previous machine, one type of switch is used for controlling the forward and in movements, controlled through relays, and another group for controlling the magnetic clutches for effecting the return movements of the slides and carriage under rapid traverse. It is found preferable when the slides and carriage are thus returned to their initial or starting positions, to stop the respective movements when the slides and carriage reach predetermined positions by means of limit switches in the clutch circuits substantially similar to those on the previous machine, and arranged to be opened individually by movement of the slides and carriage themselves. This arrangement, as previously pointed out, is such that the circuits for each of the rapid traverse clutch magnets are opened without the intervention of relays.

In the application describing the previous machine it was pointed out that after a cycle is completed and the work piece finished, the slides and carriage are all at rest and at their initial positions; the same is true in the present machine, with the additional features that rotation of the spindle is stopped. Accordingly, in the present machine the finished work, after being turned to the predetermined dimensions, may be removed and a new piece substituted while the spindle is rigidly held against rotation by the magnetic brake. Furthermore, in the present machine, the manual switch for starting the cycle of motions is arranged to not only start the cycle of movements through actuation of the relays controlling movements of the respective slides, after which the successive movements of the cycle are completed automatically, but in addition, certain relays in circuit with or controlled by the starting switch are arranged to control starting rotation of the spindle; and, indirectly of course, these relays control operation of the magnetic brake to release the spindle, so that its rotation may start.

In the machine of the prior application, the cycle of motions for the carriage and slides includes not only the front carriage and front cross feed slide, but the rear cross slide and there is no arrangement by which it is possible to eliminate from the cycle the movements of any one of the respective slides. In the present improvement, however, the circuits and relays are so arranged that movement of the rear slide may be eliminated without interfering in any manner with the cycle of motions of the carriage and its cross slide. This is a particularly desirable feature of the improvement since, in connection with the adjustable device previously referred to for starting operation of the rear slide at any point during the forward movement of the front carriage, a wide range of service for a machine of this type is provided.

The present improvement is more particularly described in connection with the accompanying drawings, in which Fig. 1 shows a plan view of the automatic lathe, substantially as in the prior application, with features of the present improvement incorporated therein; Fig. 1a is a detail view of driving connections for the cross slide; and Fig. 2 is a wiring diagram showing the circuits, relays and wiring connections of the present improvement.

Referring to the drawings, it will be seen that the lathe bed is supported on a base frame 1 and is provided with slide ways 2 and 3, at one end of which the head block 4 is mounted, the head stock being provided with bearings for the spindle 5 for supporting and rotating the work.

The spindle 5 is shown as provided with any suitable face plate 6 and center 7 for supporting and rotating the work; and on the opposite end of the lathe bed the usual tail stock and center may be mounted, but for clearness the latter are not shown. While centers are shown, a chuck is preferable for most jobs, and the usual chuck may be mounted on the spindle 5 for supporting the work when a chuck is to be used.

The spindle 5, in the present improvement, may be rotated in the usual or any preferred manner, but preferably a motor 8a or other suitable power may be provided for rotating a clutch magnet 8b freely rotatable on shaft 8f. Bevel gears 8c and 8d respectively on the shaft of motor 8a and on the magnet 8b drivingly connect the motor to the magnet, the clutch disc 8e being slidably splined to shaft 8f. The shaft 8f is arranged to drive through change gears 8g to the gear 8, secured to the spindle 5, substantially as indicated in Fig. 1. When magnet 8b is energized the clutch disc 8e is drawn into contact with the magnet 8b so that the spindle 5 will be driven by motor 8a through the above described connections. The usual apron carriage or main slide 9 is mounted at the front of the lathe on the slide way 2 for longitudinal movement along the bed parallel to the axis of the spindle. A tool carrying cross slide 10 is mounted on suitable ways on the carriage or main slide 8, for movement transversely thereof toward and from the axis of the work carried by the spindle. One or more tools 12 may be mounted on the cross slide 10 by the usual clamping means 13.

As will be seen, the main slide 9 is held to the bed of the lathe by a suitable bracket 14 and may be moved longitudinally of the bed by a lead screw 15 engaging a nut 16 carried by the apron 17 of the carriage or main slide 9. The cross slide 10 is likewise adapted to be moved transversely of the main slide 9 by a lead screw 18, preferably adapted to be rotated by bevel gears 19 and 19a, gearing it to a vertical shaft 20, supported in the apron 17 of the main slide 9. The shaft 20 is provided at its lower end with a bevel gear 21 meshing with a corresponding gear 22 held for rotation in a fixed fork 23 formed as part of the apron 17, or otherwise secured thereto, the bevel gear 22 being splined to and slidable longitudinally of a splined shaft 24, as the main slide 9 is moved by the screw 15. With this construction, it will be seen that the position of the cross slide 10 may be adjusted transversely of the main slide 9 in any longitudinal position of the latter by rotating the splined shaft 24.

At the rear of the lathe on the slide way 3, another longitudinally adjustable slide bracket 25 is mounted and held in place by a cleat 26, this slide preferably being positioned by hand along the bed of the lathe, but obviously, the usual screw feed may be provided if desired.

A rear tool carrying cross slide 27 is mounted on ways 28 on the slide bracket 25 and is movable transversely thereof by a lead screw 29. The cross slide 27 is provided with tool carrying means and may carry one or more tools 30 secured thereto, in the usual manner by clamp bolts 31. The rear tools should be inverted so as to properly engage the work.

The lead screw 29 for the rear cross slide 27 is also adapted to be rotated by bevel gears 32 connecting it with a vertical shaft 33 mounted at the rear of the slide bracket 25. The shaft 33 is provided at its lower end with a bevel pinion 34 meshing with a corresponding bevel pinion 35, held for rotation in fixed relation to the slide 25, by a yoke or bearing 36, but keyed to and slidably mounted on a splined shaft 37, so that the rear slide lead screw 29 may be rotated when the supporting bracket 25 is in any longitudinal position of adjustment. As the connection between lead screw 29 and its driving shaft 37 is similar in every way to the connection between screw 15 and shaft 24 previously described further description of this connection is not thought to be necessary.

In the present improvement the movements of the various slides 9, 10 and 27 are arranged as in the previous machine, to be effected by energizing magnetic clutches; and preferably the clutch magnets are rotated continuously while the motor 8a drives the spindle 5 independently. The shaft 42, extending longitudinally of the lathe bed (shown broken away in Fig. 1) is arranged to drive the clutch magnets for normal or cutting speed and rapid traverse. The right end of the shaft 42 is supported in a bearing 43 in a bracket 44 mounted on the right end of the lathe bed and adjacent this bearing the end of the shaft 42 carries a bevel gear 45 meshing with two similar diametrically disposed bevel pinions 46 and 47. The bevel pinion 46 is mounted on the rear end of a forwardly extending shaft 48 supported in bearings 49 formed as part of the bracket 44, the shaft 48 being provided with two bevel pinions 50 and 51 meshing, as will be seen in Fig. 1, with bevel gears 52 and 53, mounted upon clutch magnets 54 and 55. The shaft 48 may be arranged to drive all the clutch magnets by connecting it through change gears 48a with a motor 48b, or the drive for shaft 42 may be by any other well known arrangement.

The clutch magnet 54 (rotated by pinion 50) is rotatably mounted upon the end of an auxiliary shaft 56 extending longitudinally of the lathe at the front thereof and rotatably supported in a bracket 57 at its right end and in a bracket 58 at its left end, as will be seen in Fig. 1. It will be noted that in order to have the magnetic clutches 54 and 55 in the same line so as to operate them from the same shaft 48, the shaft 56 is mounted below the main slide lead screw 15 and the latter is connected to the shaft 56 by means of two spur gears 59 and 60, connected respectively to the shaft 56 and the right end of the screw 15, so that the screw 15 may be rotated by rotating the shaft 56 from either end.

The right end of the shaft 56 carries a clutch armature disc 61 for cooperation with the clutch magnet 54, the clutch disc being slidably splined to the shaft 56, so that the latter may be rotated when the clutch magnet is energized. Similarly the right end of the splined shaft 24, for rotating the cross slide lead screw 18, is provided with a clutch armature disc 62 slidably splined on the end thereof so that by energization of clutch magnet 55, the shaft 24 may be rotated for feed of the front cross slide.

The other (rear) bevel pinion 47, meshing with the gear 45, is mounted on the end of a shaft 63, extending toward the rear and supported in bearings 64 and 65. The shaft 63 carries at its rear end a bevel pinion 66, meshing with a bevel gear 67, secured to a clutch magnet 68 rotatably mounted on the end of the spline shaft 37, as will be seen in Fig. 1. The right end of the shaft 37 is rotatably supported in a bearing bracket 69 (which also supports bearing 65) secured to the rear of the lathe bed. Adjacent the bearing in 69, the shaft 37 carries a clutch armature disc 70 slidably splined on the shaft for rotating the latter by cooperation with the clutch magnet 68, when the latter is energized. By this means, it will be understood that the rear cross slide 27 may be operated for rotation of the lead screw 29 (this for rapid traverse as explained later).

The left end of the longitudinally extending connecting shaft 42 is supported in a suitable bearing bracket 71 and carries adjacent thereto a bevel pinion 72 meshing with oppositely rotated bevel pinions 73 and 74, so that these pinions are rotated from bevel gear 45 by the shaft 48. The front bevel pinion 73 is secured to the end of a short shaft 75 rotatably mounted in a bearing bracket 76 secured to the left end of the lathe bed, as will be seen in Fig. 1, this shaft 75 carries a spur gear 77 meshing with a similar gear 78 mounted on a shaft 79 having bearing in the bracket 76 and extending forward through a bearing in a bracket arm 80, shown as part of the bracket 58, previously referred to as supporting the left ends of the shaft 56 and screw 15. This same bracket also supports the left end of the shaft 24.

The shaft 79 carries at its front end a change gear or pick-off pinion 81 meshing with a change gear 82 mounted on the end of a shaft 83, extending parallel with the shaft 79 and rotatably supported in the bracket 80 and a bearing lug 84 formed as part of the bracket 76. It will be understood that with the gears 81 interchangeable with other gears the relative speeds of rotation of the shafts 79 and 83 may be varied.

The shaft 83 has mounted thereon two bevel pinions 85 and 86 meshing respectively with bevel gears 87 and 88 secured to clutch magnets 89 and 90, which are accordingly rotated in the opposite direction from the corresponding clutches 54 and 55 on the opposite ends of the respective shafts 56 and 24. The clutch magnet 89 is rotatably mounted on the left end of the shaft 56 in position to cooperate with a clutch armature 91 slidably splined on the left end of the shaft 56 so that the latter will be rotated to move the carriage or main slide 9 to the left, that is, for forward movement when the clutch magnet 89 is energized. Similarly the clutch magnet 90 is rotatably mounted upon the left end of the splined shaft 24 for cooperation with a clutch armature 92 slidably splined on the left end of the shaft 24 so that the shaft 24 may be rotated when the clutch magnet 90 is energized for the forward or in movement of the front cross slide 10.

The rear bevel gear 74, which as previously described meshes with the driven bevel gear 72 on the left end of the shaft 42, is mounted on a short shaft 93 rotatably mounted in a bearing bracket 94 and carries on its rear end a spur gear 95 meshing with a similar gear 96 mounted on a shaft 97. One end of shaft 97 has a bearing in the bracket 94 and the other end in a curved bracket 98 extending rearwardly from the lathe bed. The rear end of the shaft 97 is connected by change gears 99 and 100 with a parallel shaft 101 also rotatably mounted in the bracket 98. The shaft 101 is provided with a bevel pinion 102, meshing with a bevel gear 103, secured to a clutch magnet 104 rotatably mounted on the left end of the rear feed shaft 37, as will be seen in Fig. 1. The clutch magnet 104 is adapted to cooperate with a clutch armature 105 slidably splined to the end of the shaft 37, so as to cooperate with the clutch magnet 104 and rotate the shaft 37 when the magnet is energized.

From the described gearing arrangement, it will be seen that the various clutch magnets (89, 90, 104; 54, 55, 68) for the movements of the main carriage 9 and slides 10 and 27 are rotated in unison by the power applied to the shaft 48. By tracing the gearing connections, it will be seen that the main slide or carriage 9 is moved in the forward direction, that is, toward the left, during the cutting operation by the magnetic clutch 89, and for rapid traverse toward the right, for its return movement, by the clutch magnet 54. It will also be seen that the forward or in movement of the front cross slide 10 is effected by magnetic clutch 90 operating the splined shaft 24, while the return movement, back to initial position, is effected by the clutch magnet 55, it will be seen is rotating at higher speed. Similarly, the rear shaft 37 is rotated for the forward or in movements of the rear cross slide 27 by the clutch magnet 104, and for its return movement by the high speed clutch magnet 68. It will also be understood that by means of the change speed gears 81—82 and 99—100, for normal feeds the relative speeds of rotation of the clutch magnets 89, 90 and 104 for the forward and in movements may be varied according to requirements.

For energizing the respective clutch magnets, various circuits are provided as more particularly shown in Fig. 2, and through suitable relays and auxiliary circuits, automatic control of the succession of movements of the various slides is predetermined by switches operated by the respective slides shown in Fig. 1.

Preferably two types of switches are used; one type being referred to as limit switches 107, 108 and 109, which comprise spring contact terminals normally arranged with sufficient resiliency to close the circuit, but provided with outwardly flaring ends 110, so that the circuit may be broken by the entrance between the spring members of a bar or operating member 111 of insulating material, projecting from a bracket 112 carried by the respective slides 9, 10 and 27. In Fig. 1, the contact terminals of the limit switch 107 are shown in closed position (insulating bar 111 being withdrawn) and those of 108 closed and 109 open.

The limit switches just described (107, 108, 109) determine the initial positions of the respective slides and therefore, by opening the circuits of the rapid traverse clutch magnets limit their return movements of the respective slides. The clutch magnets are preferably operated on 110 volt current and since the limit switches are arranged directly in the circuits of the respective clutch magnets for rapid traverse return movements opening the limit switches when the slides return to their starting or initial positions immediately deenergizes the clutches and stops the movements.

Obviously, it may be desirable at times to vary the initial or starting or out limit positions of the respective slides and accordingly, the positions of each of the limit switches are adjustable, the limit switch 107 being mounted on a slotted bracket 112a so that by means of a suitable clamping screw 113, its position longitudinally of the lathe bed may be adjusted. Similarly, the limit switch 108 is mounted for adjustment relative to the cross slide 10 by means of a slot 114 and clamping screw 115, as indicated in Fig. 1. The rear cross slide limit switch 109 is likewise adjustably mounted on a slotted bracket 116 and may be clamped after adjustment by a suitable screw at 117, so that the return limit or initial position of the slide 27 may be varied.

For stopping the forward and in movements and initiating the succession of movements of the cycle, as will be more fully described later, the respective slides operate contact lever switches 118, 119 and 120 for controlling relays, preferably operating in low potential auxiliary circuits. The contact switches are mounted to be operated by the respective slides at the ends of their forward movements; for instance, the contact lever switch 118 is mounted on a supporting block 121, so as to be in position to be operated by a lug or projection 122 carried by the carriage or main slide 9. The contact lever 118 is preferably adjustable relative to the carriage 9, the block 121 being arranged to slide along a slot in the plate 121a. However, the contact lever switch 119 is preferably mounted at 123 to the slide 9, in fixed relation to the cross slide 10. The contact lever switch 120 is likewise mounted at 124 on the bracket 25 in fixed relation to the rear cross slide 27. The contact switch 119 is adapted to be opened at the end of the forward movement of the front cross slide 10, by a finger or lug 125 adapted to be adjustably clamped by a screw nut 126 on a slotted bracket 127, secured to the slide 10, as shown in Fig. 1. A similar actuating lug 128 is adapted to open the contact switch 120, the lug 128 being adjustable and clamped by wing nut 129 to a slotted bracket 130, secured to the side of the rear cross slide 27. The relative adjustment between the actuating lugs (125 and 128) and the corresponding contact lever switches (119 and 120) may be obtained by any other well known means and when desired any well known micrometer screw adjustments may be employed for close setting.

As with the machine of the prior application the various movements of the slides are arranged to follow a predetermined cycle, the movements being preferably controlled by relays and circuits substantially as shown in the wiring diagram, Fig. 2. As with the prior arrangement, there are six relays, A, B, C, D, E and F, the operation of which for starting the cycle is controlled through a starting relay G. The starting relay G, as will be explained later, is in the high potential circuit, but the relays A to F are preferably operated on low voltage current from a motor generator 131, one side of which is grounded at 132. The circuit 133 from the 10 volt generator passes to a switch arm 134 of the main switch, and when the switch arm is closed to contact shown the current passes to circuit 135 which is connected to the armature 136 of the starting relay G. This armature 136, when the relay G is not actuated, is resiliently held against a contact to the circuit 137, which by suitable branch lines passes to the respective magnets of the relays A, B, C, D, E and F, the magnet circuits being completed to ground through the respective slide operated lever contacts 118, 119 and 120 and another ground as described later.

To complete the ground circuits of the relays A and C, the circuits 138 pass to the contact cooperating with lever contact switch 119 and then to ground at 139. The operating circuits of the relays B and D are similarly completed to ground through circuits 140 to the contact cooperating with lever contact switch 118 and then to ground 141. The ground circuits of the magnets of relays E and F in this improvement differ considerably from those described in the previous application. For instance, the ground circuit 140a from relay magnet E is divided and branch 140b goes to join circuit 140 and then to ground through contact lever 118 and ground 141. The other branch 140c goes to a limit switch 108a, similar to the interrupter 108, and preferably mounted in the same plane therewith for operation by a similar insulator plug 111a (for clearness 108a and 111a are shown at one side of 108 and 111), and this switch (108a) when closed completes the circuit to ground 140d. For relay magnet F the circuit to ground is through circuit 142 to the contact of an auxiliary lever contact switch 142a normally held open by spring 142b but adapted to close on contact 142c to complete the circuit 142d to 120 and then to ground at 143.

For closing the ground circuit 142 to 142d the contact lever 142a may be provided with a roller 142f with which the beveled end 17a of a square rod 17b cooperates. The rod 17b as will be seen in Fig. 1, is preferably mounted upon the main slide or front carriage 17, and may be adjusted relatively thereto by a thumb screw 17c. Thus it will be seen that the auxiliary contact lever 142a may be actuated to close the ground of the relay F at any point in the forward run of the front carriage 9, and by removing the rod 17b the ground to 143 will not be closed.

The clutch magnets (54, 55, 68, 89, 90, 104) are preferably energized by high potential or 110 volt current and the main plus circuit line is indicated at 144, which passes to the arm 145 of the main double arm switch SM and when this switch is thrown to the right, the plus side 144 of the line circuit is completed to circuit 146, which, it will be seen, divides, one part going to the motor 147 of the motor generator and thence by circuit 148 to the negative side 149 of the main line 110 volt circuit.

Another part of the plus circuit 146 goes to the armature 150, of relay E which when not energized (armature up as shown in Fig. 2) closes on circuit 151, which is connected to the switch arm 152 of starting switch SS. The starting switch SS (152) is normally closed on circuit 153, which, it will be seen, passes through the magnet of the starting relay G. Instead of going immediately to the negative side of the circuit from relay G, the circuit passes by lead 153a to the magnet of a relay H, controlling rotation of the spindle. The circuit 149a from relay H preferably passes through a 1000 ohm resistance 149b and then to the negative side of the main line circuit 149.

Two branch circuits of circuit 151 pass to contacts of a two arm contactor or automatic switch 154 through which they connect with circuits 155 and 156, the circuit 155 passing through the main slide limit switch 107 and then to the main slide return clutch magnet 54 (MS Rgt) and by 157 to the negative side of the main line circuit 149.

The circuit 156 passes to the rear slide limit switch 109 and then to the rear slide return clutch magnet 68 (RS Out) and from there by 158 to the negative side of the main line circuit 149.

It will be seen that the automatic double contactor 154 is operated by a branch of the positive main line circuit 146, which passes through an operating coil 159 and then to the negative circuit 149.

Going back to relay E, it will be seen that if the armature 150 is drawn down by actuation of the magnet, the positive circuit 146 is carried through to circuit 160, which is connected to the armature 161 of the relay B and from the armature 161, when in normal up position (that is magnet B not energized), the circuit is closed to circuit 175 directly to limit switch 108 and thence to the front slide return clutch magnet 55 (FS Out) and then through 176 to the negative side 149.

In the present improvement the circuit 160 has a branch 162 leading to the armature 163 of the relay F and when relay F is energized, the armature 163 closes on circuit 164, which passes to the in-feed rear clutch magnet 104 (RS In) and thence through 165 to the negative side 149 of the main line circuit.

When the armature 161 of relay B is drawn down by energization of the relay magnet, the circuit 160 closes through to circuit 166, which is divided, one branch going to the armature 167 of the relay A; and when this armature 167 is drawn down, it closes on circuit 168 to the clutch magnet 90 (FS In) for in feed of the front cross slide, and from there through 169, to the negative side 149 of the main line circuit. The other branch of circuit 166 passes to armature 170 of relay C. This armature 170, in normal up position, with the relay magnet deenergized, closes to circuit 171 which goes to armature 172 of relay magnet D and thence, when the relay D is energized to circuit 173; the latter going to the main slide clutch magnet 89 (MS Lft) and from there by 174 to the negative side 149 of the circuit.

The positive main line circuit 146 in this new machine has a branch 146a leading to the armature H₁ of the spindle control relay magnet H, the armature when the relay is not energized being held closed on circuit H₂ which is connected with the magnet of a relay K, for controlling the energization of a brake magnet 8h, and then through lead H₃ to the spindle clutch 8b and from there through H₄ to negative side 149. The main circuit 146a also has a branch to the armature K₁ of the brake control relay K, the circuit passing from the armature K₁ by circuit lead K₂ to the brake magnet 8h and then through lead K₃ to the negative side 149.

Preferably the brake magnet is a clutch magnet on the same shaft 8f with the spindle clutch magnet 8b and cooperates with an armature disc 8k integral with the disc 8e, and therefore slidably splined to the drive shaft 8f of the spindle. The brake magnet 8h is held from rotation in any suitable manner as by bracket clip 8m. It will be seen that the circuits of the relays H and K and the respective armatures H₁ and K₁ are so arranged that when the spindle clutch magnet is energized the brake magnet is deenergized and vice versa. Accordingly, when the spindle 5 is not rotating it will be held against rotation by the brake clutch 8h. Obviously, any suitable magnetic brake scheme may be employed.

If the arm 145 of the main line switch SM is thrown to the left, the positive main line circuit 144 is connected to circuit 177, which by suitable branches is connected with three switches S1, S2 and S3 normally open as indicated in Fig. 2. When the S1 switch arm 178 is closed the circuit 177 is connected to circuit 179 which joins with circuit 155 going through the limit switch 107 to clutch magnet 54 and then through 157 to the negative side of the circuit 149.

When the contact lever 180 of switch S2 is closed, the circuit 177 is completed to circuit 181, which, as will be seen, is connected to circuit 156 going through limit switch 109 to the rear return clutch magnet 68 and then to the negative side 149.

When the contact arm 182 of switch S3 is closed, the positive circuit 177 closes to circuit 183 which joins circuit 175, the latter passing through limit switch 108 and then to the front slide return clutch magnet 55 and from there through 176 to the negative side 149 of the line circuit.

The operation may be described as follows in connection with Fig. 2, assuming that the motors 8a and 48b are running at substantially constant speeds, the various elements being there shown substantially in normal idle positions. The first step is to close the main switch SM (arm 145 to right) so that the L plus 110 volt circuit 144 is completed to circuit 146 and the 10 volt circuit 133 from the generator 131 by arm 134 is closed on circuit 135. The circuit 146 to the motor 147, starts the latter, the circuit being completed directly to the minus side 140 of the 110 volt circuit through 148.

Another branch of the plus circuit 146 by passing through the coil 159 closes the double contact switch 154, this branch of the circuit 146 being connected directly to the minus side 149.

The main division of the plus circuit 146, however, goes through armature 150 of relay E and then back through circuit 151 and through starting switch arm 152, which, as previously indicated, is closed, and then by circuit 153 through the coil of relay G, through line 153a to the coil of relay H then through 149a and resistance 149b and to the negative side of the mainline circuit 149. Accordingly the starting relay G is energized and draws down the armature 136 to break the circuit so that the low potential current starting in circuit 135 cannot pass to circuit 137 to energize or operate any of the relays A to F inclusive. Likewise, the energizing of relay H draws down the armature H₁ and breaks the circuit from 146 and 146a to H₂ so that the brake clutch 8h remains energized.

At this time it will be understood that all the slides are in their initial positions, that is, the main slide 9 is at its starting position at the right; the front cross slide 10 is in its initial or full "out" position; and the rear slide 27 is in its "out" position, thus all of the limit switches 107, 108, 108a and 109 are held open. With the slides all back, it will be understood that all of the lever contact switches 118, 119 and 120 are closed, so as to ground and complete the control relay circuits when the cycle is started, but contact lever 142a in the rear slide ground circuit 142 is open so that this ground cannot be completed until the contact lever is operated by the bar 17b.

The momentary starting switch lever 152 of the starting switch SS is now depressed, thus breaking the circuit 151—153, 153a through the coils of relays G and H, thereby permitting the respective armatures 136 and H₁ of the relays to rise to close circuit 135 on circuit 137 so as to energize or place in condition to be energized when the grounds are completed the series of relays A, B, C, D, E and F; and to close circuit 146a on circuit H₂—H₃ so as to energize spindle clutch magnet 8b and start rotation of the spindle 5, the circuit being completed through H₄ to minus side 149.

It will be noted that the circuit H₂—H₃ energizes the magnet of relay K and draws down armature K₁ to break the circuit 146a—K₂—K₃ to deenergize the brake magnet 8h and release the spindle for rotation. The circuits 137 of the several relays are completed through circuits 138 and ground 139 for relays A and C; circuit 140 and 140b and ground 141 for relays B, D and E, with the additional ground circuit 140c through limit switch 108a to ground 140d for relay E; circuit 142, auxiliary lever contact 142a—142c, circuit 142d and ground 143. The relay armatures are thereby all drawn down except armature 163 of relay F, and the circuit 146 through the armature 150 (relay E) to circuit 151 is broken so that the starting key SS may be released without energizing relays G and H, and current in circuit 146 through armature 150 is carried to circuit 160, which going through armature 161 (relay B energized) to the lower circuit 166 will carry the plus current to armature 167 of relay A and through circuit 168 to clutch magnet 90, marked FS In, the latter being the clutch magnet for in feed of the front cross slide, the circuit being completed by line 169 to the negative main line circuit 149.

The in movement of the front cross slide 10 thus started will continue until the lever contact 119 is broken by the tappet lug 125, whereby the ground circuit 138, 139 will then be broken, following which the armatures of relays A and C will be released and restored to normal up positions. The circuit 168 to the clutch magnet 90 being thus broken and the in movement of the slide 10 will be stopped with the tool in position for making the cut on the work W, which will be effected by forward movement, that is, movement to the left, by the main slide 9. Now tracing the plus current through circuit 160 and through armature 161, which is down, to circuit 166, it will be seen that the latter is connected with armature 170 of relay C, the magnet of which has been deenergized by the breaking of the ground circuit 138—139, so that the relay armature 170, being up, closes on circuit 171 carrying the positive current to armature 172, which is down (D being energized) and by circuit 173 the current is carried to the clutch magnet 89, marked MS Lft, and thence by lead 174 to the negative side 149 of the main line circuit. Left feed movement of the main carriage or main slide 9 is, therefore, started and the tool 12 is moved to the left for the cutting operation on the work W.

As distinguished from the arrangement in the previous application, it will be seen that armature 163 of relay F is up at the start of the left or forward movement of the carriage or main slide 9, because the contacts 142a at 142c of the ground 142—143 are open. When, however, the beveled end 17a of the bar 17b, which has previously been adjusted to start the rear slide at the preselected point in the movement of the carriage, engages the roller 142f on the contact lever 142a then the ground circuit 142—143 is completed. The relay F is then energized from circuit 137 and the armature 163 is drawn down to close branch circuit 162 (from 160) to circuit 164 and the clutch magnet 104, RS In, is energized to start forward or in movement of the rear cross slide 27. In this way the in movement of the rear slide may be started at any time before the end of the run of carriage 9. Incidentally, it will be seen that by removing the bar 17b from the carriage 9, the contact lever 142a will not be actuated and the rear cross slide is eliminated from the cycle.

The left or forward movement of the main slide 9 after being started, as above indicated, will continue until the stud 122 thereon engages the contact lever 118 and breaks the ground circuit 140 and 141, thus deenergizing the magnets of relays B and D and breaking the ground circuit 140b of relay E, but since the cross slide 10 is all the way in the limit switch 108a is closed and the armature 150 of relay E is held down by ground 140d. Deenergizing relays B and D, however, allows the armatures 161 and 172 to return to normal up positions and the circuit 173 to clutch 89 will be broken so that left movement of the main slide 9 is stopped. At the same time the armature 161 of relay B, by being drawn up, closes the circuit 160 to circuit 175 and through limit switch 108, which is closed because the front cross slide 10 is in its forward or in position, and since circuit 175 passes to the FS Out clutch magnet 55, the latter will be energized, to bring into action the rapid traverse for return of the front slide 10 to initial out position at high speed, the circuit 175 being completed through 176 to the negative side 149 as previously indicated.

As soon as the front slide 10 reaches initial position, two things now happen, the limit switch 108 will be opened by the bar 111 to stop the return movement of the cross slide 10, and the auxiliary bar 111a will open limit switch 108a and break the final ground circuit 140c—140d of relay E and allow armature 150 to rise.

At this point, it should be noted that when the front slide 10 starts on its return to initial position, the lever contact switch 119 is again closed, but owing to the fact that the 110 volt circuit is broken at other points (relay B deenergized) the main line circuit of the slide for in movement will not be again closed until the cycle is repeated.

The rear slide 27, the in movement of which is started by the bar 17a—17b, will continue its in movement by energization of clutch magnet 104 RS In until the trip arm 128 engages the contact lever 120 and breaks the ground circuit 142, 143, thus deenergizing the magnet of relay F, so that the armature 163 thereof will return to normal up position and the circuit 164 to the RS In clutch magnet 104 will be broken, thus stopping the in movement of the rear slide.

When the armature 150 of relay E is lifted, upon deenergization of relay E by breaking the ground 140d, the ground of contact lever 118 being also broken, the plus circuit 146 is again closed to circuit 151 and through the double contactor 154 to circuits 155 and 156. Tracing circuit 155, it will be seen that the current passes through the limit switch 107, which is closed because the main slide 9 is at the extreme left, and energizes the rapid traverse clutch magnet 54, marked MS Rgt, for high speed return movement of the main carriage or slide 9. When the main slide 9 reaches its initial or starting position, the switch bar 111, by entering the limit switch 107, will break the circuit 155 and stop the return movement of the main slide.

The current in circuit 156 (from double contractor 154), passing through limit switch 109, the latter being closed, since the rear cross slide 27 is still in its forward position, will energize clutch magnet 68, marked RS Out, and thus return the slide 27 to its initial position at relatively high speed or by rapid traverse. Upon the rear slide 27 reaching its initial position, the switch bar 111 thereon will open the limit switch 109 and deenergize clutch magnet 68 to stop the return movement.

It will be seen that, in the present arrangement, the carriage or main slide 9 cannot return to the right, even though the ground contact 118 is opened by engagement of 122 therewith, until front cross slide 10 returns to initial position and opens limit switch 108a and breaks the auxiliary ground 140d.

Furthermore, it will be noted that upon the start of the return movements of the main slide 9 and the rear slide 27 by the closing of armature 150 on circuit 151, this circuit also carries the current through starting switch SS—152, circuit 153, relay G and relay H, thus breaking low potential circuit 135—137 and breaking the high potential circuit 146a—H₂, through relay K, circuit H₃ and clutch magnet 8a, to deenergize the latter and stop rotation of the spindle 5. This deenergizes the relay K and permits armature K₁ to rise so that current from circuit 146a passes to circuit K₂ and the brake magnet 8h is energized, and substantially instantly stops rotation of the spindle. The brake magnet will then fixedly hold the spindle so that the finished piece may be removed and a new piece inserted.

The cycle of movements having been completed and the slides 9, 10 and 27 are all back at their initial or starting positions ready for another cycle and as just stated rotation of the spindle is stopped and the spindle is held by the brake clutch. After inserting the work piece and again depressing the starting switch SS, the cycle is repeated automatically, and may be continuously repeated without further attention from the operator, except to remove the finished pieces and insert new pieces.

If at any time it becomes necessary to return the slides to their initial positions before the completion of a cycle of movements, the main switch SM is thrown to the left, thus cutting out the low potential circuit 135 and carrying the current in the L plus circuit 144 to circuit 177 and the manual switches S1, S2 and S3. Cutting out circuit 146 stops the motor generator and releases the contactor switch 154 and deenergizes the magnet of starting relay G, but there is no low potential current so the relays A, B, C, D, E and F are idle; and relay H is deenergized, but the current through 146—146a is stopped so that the spindle clutch 8b will not be energized for rotation of the spindle even though the brake clutch is deenergized.

Now if it is desired to return the main slide 9 to its initial position, the key bar 178 of switch S1 is depressed, closing circuit 177 to 179—155 and the current passing through circuit 155 (limit switch 107 closed) will energize the rapid traverse return magnet 54 and thus bring the carriage or main slide 9 back to its initial position, at which time the switch bar 111 will again open the limit switch 107, and stop the movement.

Similarly the rear cross slide 27, if and when it is operated, may be returned to its initial position by depression of the key bar 180 of switch S2, thereby closing circuit 177 on 181—156 and thus directing the current by circuit 156 (limit switch 109 closed) to the rapid traverse return clutch magnet 68, RS. Out and return movement of the slide 27 will continue until the circuit is broken by the bar 111 of slide 27 opening the limit switch 109.

Likewise by depressing the key 182 of switch S3, the circuit 177 is closed on 183—175 which directs the current through circuit 175 (limit switch 108 closed) to energize the rapid traverse return clutch magnet 55 (FS Out) and return the front slide 10 to its starting position. When the front slide 10 reaches its initial position, the switch bar 111 opens the limit switch 108 and by breaking the circuit 175, stops the return movement.

The present improvement differs from the automatic lathe of the previous application in that means is provided for completely eliminating the rear cross slide from the cycle without disturbing the rest of the cycle of movements. This, as previously pointed out, is effected by keeping the relay F from becoming energized, and this may be done by keeping the ground 142—143 open in any suitable manner. In the present instance it is only necessary to remove the bar 17b, and thereby prevent the operation of contact lever 142a, to prevent the operation of the rear slide 27 in the cycle.

Obviously the rear cross slide may be dispensed with entirely, or it may be mounted upon a longitudinally movable carriage similar to the main slide 9.

While the preferred form of the improvement has been shown and described, it will be understood that the electrical control through prearranged cycles of movements for the various slides may be arranged differently or different varieties of tools may be controlled in substantially the same way without departing from the spirit and scope of the invention.

What I claim is:

1. An automatic lathe comprising in combination a rotatable work spindle, a clutch magnet for effecting rotation thereof, a tool supporting carriage, a tool thereon movable longitudinally and transversely relative to the spindle, clutch magnets for effecting forward and return movements of said carriage, circuits for energizing the respective clutch magnets, a manually operated switch controlling said energizing circuits for starting rotation of the spindle and movements of the tool, switches in said circuits arranged to be operated by movement of said tool to control the movements of the latter and for deenergizing the spindle clutch magnet and a magnetic brake arranged to be energized to stop rotation of said spindle when said spindle rotating magnet is deenergized.

2. An automatic lathe comprising in combination a rotating work spindle, a clutch magnet for effecting rotation thereof, a magnetic brake for stopping rotation of said spindle, a tool supporting carriage, a tool thereon, clutch magnets for effecting forward and return movements of said carriage, circuits for energizing the respective magnets, a manually operated starting switch for controlling energization of the respective magnets for starting rotation of the spindle and movements of the tool, and switches in said circuits arranged to be operated by the movement of said tool for controlling movements of the latter, one of said latter switches being arranged to stop rotation of said spindle at the end of the carriage return movement.

3. An automatic lathe comprising in combination a rotatable work spindle, a clutch magnet to effect rotation thereof, a carriage movable longitudinally of said spindle, a tool supporting slide movable thereon, clutch magnets for effecting forward and return movements of the carriage and in and out movements of the slide respectively, circuits for energizing the respective clutch magnets, switches in said circuits arranged to be operated by the carriage and slide for controlling energization of the respective clutch magnets to effect movements respectively of the carriage and cross slide, and switches operating to energize and deenergize the clutch magnet for rotating the spindle, the operation of said switches being so arranged that rotation of the spindle and the movements of the carriage and slide follow in prearranged sequence.

4. An automatic lathe comprising in combination a rotatable work spindle, a clutch magnet to effect rotation thereof, a carriage movable longitudinally of said spindle, a tool supporting slide movable thereon, clutch magnets for effecting forward and return movements of the carriage and in and out movements of the slide respectively, circuits for energizing the respective clutch magnets, switches in said circuits arranged to be operated by the carriage and slide for controlling energization of the respective clutch magnets to effect movements respectively of the carriage and cross slide, switches operating to energize and deenergize the clutch magnet for rotating the spindle, the operation of said switches being so arranged that rotation of the spindle and the movements of the carriage and slide follow in prearranged sequence, and a magnet arranged to be energized to stop rotation of said spindle when said spindle clutch magnet is deenergized.

5. An automatic lathe comprising in combination a spindle for rotating the work, a carriage movable longitudinally thereof, a tool carrying slide movable on said carriage, a tool carrying rear slide, clutch magnets arranged for rotating said spindle and effecting movements of said carriage and the tool slides, means for energizing and deenergizing said clutch magnets in prearranged succession so that rotation of said spindle and movements of said carriage and slides are effected in predetermined sequence, means arranged to be operated by said carriage to initiate the cycle of movements of said rear slide, said means being adjustable whereby movements of the rear slide may be started at different predetermined positions of the carriage, and independent means for rotating said spindle rotating clutch magnet.

6. An automatic lathe comprising in combination a spindle for rotating the work, a carriage movable longitudinally thereof, a tool carrying slide movable on said carriage, a tool carrying rear slide, clutch magnets arranged for rotating said spindle and effecting movements of said carriage and the tool slides, means for energizing and deenergizing said clutch magnets in prearranged succession so that rotation of said spindle and movements of said carriage and slides are effected in predetermined sequence, means arranged to be operated by said carriage to initiate the cycle of movements of said rear slide, said means being adjustable whereby movements of the rear slide may be started at different predetermined positions of the carriage, means for constantly rotating the clutch magnets for the respective movements of the carriage and slides, and independent means for rotating said spindle rotating clutch magnet.

7. An automatic lathe comprising in combination, a work supporting and rotating spindle, a carriage movable longitudinally thereof, a tool slide movable on said carriage, a rear tool slide mounted independently of said carriage and movable transversely of the spindle, magnetic clutches for rotating the spindle and effecting movements respectively of the carriage and slides, electric circuits for operating the respective magnetic clutches for rotating said spindle and effecting the movements of the carriage and slides, circuit closing contactors operated by and controlling movements respectively of said carriage and the slides for successively effecting said movements in predetermined sequence, and means mounted on said carriage for operating a contactor for initiating movement of said rear slide, said means being adjustable so that said movement may be initiated at any predetermined point in the path of movement of the carriage.

8. An automatic lathe comprising a spindle for rotating the work, tool carrying slides having movements relative to the work, a clutch magnet for rotating the spindle, clutch magnets for effecting movements of said slides, operating circuits for relays controlling circuits for energizing said clutch magnets, means operated by the slides for controlling through said operating circuits the energization of the respective clutch magnets so that movements of the slides follow a prearranged cycle, a starting switch for starting the cycle of movements of the slides and controlling energization of the clutch magnet for rotating the spindle and means brought into action by one of the slides at a predetermined point in the cycle for deenergizing said spindle clutch magnet to stop rotation of the spindle.

9. An automatic lathe comprising a spindle for rotating the work, tool carrying slides having movements relative to the work, a clutch magnet for rotating the spindle, clutch magnets for effecting movements of said slides, a relay and operating circuits controlling energization of said spindle clutch, relays and operating circuits controlling energization of the respective magnets for effecting movements of the slides, means operated by the respective slides in their movements for operating said relays and controlling energization of the clutch magnets so that movements of the slides follow a prearranged cycle, a starting switch controlling operation of certain of said relays for starting rotation of said spindle and controlling the cycle of movements of the slides, and means operated by one of the slides at the end of its movement for deenergizing said spindle clutch magnet to stop rotation of the spindle.

10. An automatic lathe comprising a spindle for rotating the work, tool carrying slides having longitudinal and cross-feed movements relative to the work, a clutch magnet for rotating the spindle, a brake magnet for stopping rotation of the spindle, clutch magnets for effecting movements of the respective slides, circuits and relays controlling energization of the spindle rotating clutch and brake magnets, circuits controlling relays operated by the slides for controlling energization of the respective slide clutch magnets to effect movements of the slides in a prearranged cycle, a starting switch in the circuit of the spindle clutch relay, a relay in said starting switch circuit for starting the cycle of of movements of said slides and the rotation of the spindle, and means controlled by the slides and operated at a prearranged point in said cycle for deenergizing said spindle clutch magnet and energizing said brake magnet to stop rotation of the spindle.

11. An automatic lathe comprising a spindle for rotating the work, tool carrying slides having longitudinal and cross feed movements relative to the work, clutch magnets for effecting movement of said slides, circuits and relays operated by the slides for controlling energization of the respective slide clutch magnets to effect movements of the slides in a prearranged cycle, a clutch magnet for rotating the spindle, circuits and a relay controlling energization and deenergization of said spindle rotating clutch magnet, a starting switch in the circuit operating said spindle relay, a second relay in the starting switch circuit for starting movements of the slides in the prearranged cycle and for energizing the clutch magnet for starting rotation of the spindle, means operated by said slides for causing deenergization of said spindle clutch magnet, and means controlled by said spindle relay for stopping rotation of the spindle when said spindle clutch magnet is deenergized and for holding said spindle against rotation when the cycle of movements of the slides is completed.

12. An automatic lathe comprising a spindle for the work, tool carrying slides movable relative to the work including a carriage having movement parallel with the spindle, a cross slide on the carriage having in and out movements, a rear cross slide having in and out movements relative to the spindle, means for rotating the spindle, clutch magnets for effecting movements of the slides in a prearranged cycle, circuits for energizing the respective clutch magnets, switches controlled by the slides for automatically effecting the respective movements of the slides in the prearranged cycle, adjustable means controlled by said carriage for starting the in movement of the rear cross slide at any predetermined point during the forward movement of said carriage, and means to complete the cycle of operation of said carriage and its cross slide without movement of said rear slide.

ROBERT D. SHAW.